United States Patent
Kim

(10) Patent No.: US 8,489,076 B2
(45) Date of Patent: Jul. 16, 2013

(54) METHOD AND APPARATUS FOR CONTACT INFORMATION MANAGEMENT IN MOBILE TERMINAL

(75) Inventor: Tae Yeon Kim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/208,397

(22) Filed: Aug. 12, 2011

(65) Prior Publication Data

US 2012/0052848 A1  Mar. 1, 2012

(30) Foreign Application Priority Data

Aug. 26, 2010  (KR) .......................... 10-2010-0082890

(51) Int. Cl.
*H04W 4/00*  (2009.01)

(52) U.S. Cl.
USPC ..................................... 455/414.1; 455/556.2

(58) Field of Classification Search
USPC ................ 455/414.1–415, 550.1, 551, 556.1, 455/556.2, 566; 707/610–622, 640–643, 707/687–704, 790–800
See application file for complete search history.

(56) References Cited

U.S. PATENT DOCUMENTS

2006/0085483 A1\* 4/2006 Mooney et al. ............... 707/200
2008/0052307 A1\* 2/2008 Dunn et al. ................... 707/101
2009/0143052 A1  6/2009 Bates et al.

FOREIGN PATENT DOCUMENTS

| EP | 1718044 A2 | 11/2006 |
| JP | 2007-129692 A | 5/2007 |
| KR | 10-2002-0037567 A | 5/2002 |
| KR | 10-2007-0093643 A | 9/2007 |
| KR | 10-0819154 B1 | 4/2008 |
| WO | 2007/125427 A2 | 11/2007 |

OTHER PUBLICATIONS

Sprint; "Palm Pre Phone User Guide;" Hewlett-Packard Development Company; 2009; Rtrvd from internet: http://www.hpwebos.com/us/support/handbooks/pre/p100eww/PalmPre_UG_Sprint_p100eww.pdf; XP002669579.

\* cited by examiner

*Primary Examiner* — Kashif Siddiqui
(74) *Attorney, Agent, or Firm* — Cha & Reiter, LLC

(57) ABSTRACT

Provided is a contact management method in a mobile terminal that provides a contact synchronization function. A contact list editing screen is displayed, wherein, when a contact integrating function is performed, an entire contact list is scrollably displayed in a first area and a contact list for integrated management is displayed in a second area. Contacts selected from the first area are registered in the contact list of the second area. A primary contact in the contact list registered in the second area is maintained in the first area, while secondary contacts registered in the second area are deleted from the first area.

19 Claims, 5 Drawing Sheets

METHOD AND APPARATUS FOR CONTACT INFORMATION MANAGEMENT IN MOBILE TERMINAL

CLAIM OF PRIORITY

This application claims the benefit under 35 U.S.C. §119(a) from a Korean patent application filed in the Korean Intellectual Property Office on Aug. 26, 2010 and assigned Serial No. 10-2010-0082890, of which the entire disclosure is hereby incorporated by reference in its entirety.

BACKGROUND OF THE INVENTION

1. Field of the Invention

The present invention relates generally to wireless communications and mobile terminals, and more particularly to managing contact information within a mobile terminal.

2. Description of the Related Art

Due to recent dramatic advances in information, communication and semiconductor technologies, the adoption and use of mobile phones has been rapidly increasing. In particular, the role of mobile terminals has extended beyond the traditional phone and evolved toward mobile convergence, to encompass a variety of other tasks. The functionality of new mobile terminals now extends beyond voice calls and messaging to include, e.g., Internet connectivity; TV broadcast reception; music playback; camera and video recording; and contact management.

The contact management function allows a user to manually enter information for each contact, such as the contact's name or nickname, home number, mobile number, email address and postal address. New mobile terminals also provide a contact list synchronization function designed to download contact information saved in a computer or web server to the mobile terminal or upload contact information saved in the mobile terminal to the computer or web server.

Meanwhile, increasing attention has been focused recently on social network services (SNSs), such as Facebook®, Twitter® and Google®. An SNS provides a contact list storage service as well as a contact list synchronization service. A user can send a contact list registered with the web server providing the SNS to the mobile terminal. Thus the mobile terminal can store a plurality of contacts in addition to those stored in a phone book entered by the user. However, when a mobile terminal receives contact information from multiple sources, different contact information may be received for the same person. That is, a problem may arise when contact information registered for the same person with different web servers, is not identical.

Moreover, it is not uncommon for an SNS friend list and thus ultimately a phone book list to grow into the hundreds or well over a thousand contacts. The large number of contacts makes it difficult to quickly locate a contact in the phone book or in some cases to even remember each contact. Thus, under certain scenarios such as those just described, a conventional mobile terminal cannot efficiently manage the contact list.

SUMMARY OF THE INVENTION

The present invention provides a method and apparatus for contact information management of a mobile terminal, in which multiple related contacts are integrated into one primary contact such that only the primary contact is displayed in a contact list. As a consequence, the contact list is simplified, thereby facilitating its use, particularly for contact lists containing a large number of contacts.

The present invention also provides a method and apparatus for contact information management of a mobile terminal in which the primary contact can be easily changed.

Further, the present invention provides an apparatus displaying information on a mobile terminal, configured to display a plurality of items in a list within a first area; and at least first and second selected and related items of the plurality of items in a second area. The second selected item is removed from the first area, thereby simplifying the item list.

In accordance with an exemplary of the invention, the invention provides a method for contact management in a mobile terminal that provides a contact synchronization function, the method including: displaying a contact list editing screen having a first area in which an entire contact list is scrollably displayed and a second area in which a contact list for integrated management is displayed; registering at least first and second contacts, which are selected from the first area, in the contact list of the second area, with the first contact being designating a primary contact and the second contact designated a secondary contact; and deleting the secondary contact from the contact list of the first area while maintaining the primary contact in the contact list of the first area.

In accordance with another exemplary embodiment of the invention, the invention provides an apparatus for contact management of a mobile terminal that provides a contact synchronization function, the apparatus including: a display unit configured to display a contact list editing screen having a first area in which an entire contact list is scrollably displayed and a second area in which a contact list for integrated management is displayed; and a controller configured to register at least first and second contacts, which are selected from the first area, in the contact list of the second area, with the first contact designated a primary contact and the second contact a secondary contact, and the controller configured to delete the secondary contact from the contact list of the first area while maintain the display of the primary contact in the contact list of the first area.

In accordance with another exemplary embodiment of the invention, the invention provides an apparatus for displaying information on a mobile terminal display the apparatus including: a display unit configured to display a plurality of items in a list within a first area; and the display unit displaying at least first and second selected and related items of the plurality of items in a second area, and removing the second selected item from the first area.

Advantageously, the contact list is thereby simplified, while the user can still retrieve the secondary contact information in a contact list viewing mode by selecting the primary contact, whereupon both primary contact information and related secondary contact information is retrievable.

BRIEF DESCRIPTION OF THE DRAWINGS

The above features and advantages of the present invention will be more apparent from the following detailed description in conjunction with the accompanying drawings, in which like reference numerals denote like elements or features, wherein.

DETAILED DESCRIPTION OF EXEMPLARY EMBODIMENTS

In one aspect of the present invention, related items such as related contacts can be managed through two areas on a mobile terminal display. For example, related items comprising a representative or "primary" item and one or more "secondary" items can be displayed in one area (e.g., a "second area" as described below), while only the primary item is displayed in another area (e.g., a "first area" as described below). Here, the primary item can be designated as a representative item of the one or more secondary items displayed in the second area. Since secondary item information is deleted from the first area, the first area is simplified and thereby becomes more manageable to the user. Further, the user can easily access the secondary items by referring to the primary item which is easily recognizable by the user. In the following description of the present invention, exemplary embodiments are illustrated in which the at least one item is contact information; however, the invention is not so limited and may have applications to other types of data.

In the following description, a mobile terminal according to an exemplary embodiment of the present invention is a terminal having a contact list synchronization function in which the mobile terminal can obtain contact information from a variety of sources such as from multiple SNSs. The mobile terminal can be, for example, a mobile communication terminal, a smart phone, a tablet personal computer (PC), a portable multimedia player (PMP), a navigation terminal, or a personal digital assistant (PDA).

Figure 1:
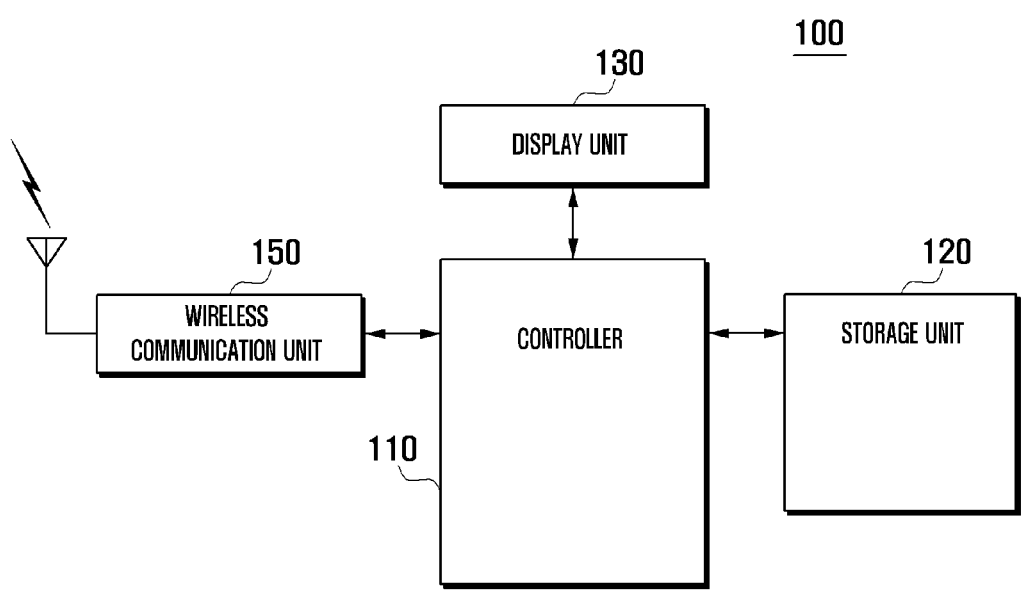
FIG. 1 is a schematic block diagram illustrating the configuration of a mobile terminal according to an exemplary embodiment of the present invention.

FIG. 1 is a schematic block diagram illustrating the configuration of a mobile terminal 100 according to an exemplary embodiment of the present invention. The mobile terminal 100 includes a controller 110, a storage unit 120, a display unit 130, and a wireless communication unit 150.

The wireless communication unit 150 can form a communication channel for call connection and a communication channel for data transmission. For example, the wireless communication unit 150 can form a voice call channel and a video call channel between a base station and the wireless communication unit 150, and transmits or receives a voice signal and a video signal to/from other terminals through the voice call channel and the video call channel. The wireless communication unit 150 can include a radio frequency (RF) transmission unit (not shown) for performing frequency up conversion and amplification on a transmission signal, an RF receiver unit (not shown) for performing frequency down conversion and low noise amplification of a received signal, and a transmitter/receiver separator (not shown) for separating the transmission signal and the received signal. In particular, the wireless communication unit 150 according to the present invention, under the control of the controller 110, can receive contact information from at least one web server (not shown) or transmit contact information stored in the storage unit 120 to the web server. The web server can provide a contact synchronization service. For example, the web server can be a server that provides a social network service (SNS) such as Twitter®, Facebook®, or Google®. The wireless communication unit 150 can communicate with the web server through a mobile communication network such as, for example, code division multiple access (CDMA), wideband code division multiple access (WCDMA), global system for mobile communication (GSM) or a short-range wireless communication module such as Wi-Fi, WiMax, or wireless LAN. Alternatively, the wireless communication unit 150 can communicate with the web server through a portable Internet communication module such as WiBro.

The display unit 130 displays user entered information or information provided to the user including various menus of the mobile terminal 100. For example, according to an operation mode of the mobile terminal 100, the display unit 130 can provide various screens such as a standby screen, a menu screen, a message writing screen, or a video call screen. In particular, the display unit 130 according to the present invention can display a contact list editing screen for managing a contact list. The editing screen comprises two areas: a main contact list area in which all contacts can be scrollably displayed, and another area in which selected related contacts are displayed. The contact list editing screen will be further described in detail with reference to the example screens of FIGS. 3 through 5. The display unit 130 can include a liquid crystal display (LCD), an organic light emitting diode (OLED), or an active matrix organic light emitting diode (AMOLED). When the display unit 130 is embodied as a touch screen, it can perform an input function.

The storage unit 120 stores an operating system (OS) of the portable terminal 100, and stores application programs for providing optional features. Such features may include audio, image and video reproduction, plus storage of user data and other data received and to be transmitted. In particular, the storage unit 120 according to the present invention can store the contact list. The contact list can include, for each contact, e.g. a name, a mobile phone number, a home number, a work number, an email address, and an image of the person or entity represented by the contact name (e.g., a family member, a friend, a coworker, or a business or organization). The contact list can include a contact downloaded from multiple web servers such as Google®, Twitter®, or Facebook®, a contact downloaded from a personal computer (PC), or a contact manually entered by the user via the mobile terminal. Thus, the storage unit 120 can include multiple contacts for the same person or entity. The storage unit 120 can store a contact management program for managing the multiple contacts by using a primary contact. The contact management program can display only the primary contact in the contact list among other multiple related contacts. A detailed description thereof will be provided below.

The controller 110 can control an overall operation and a signal flow between internal blocks of the mobile terminal 100. In particular, the controller 110 according to the present invention can control a contact integrating function. The contact integrating function is a function that manages integrated contacts that are registered with the multiple web servers or a computer or manually entered by the user. More specifically, by using the contact integrating function, a plurality of related contacts can be managed by using a representative contact, which is displayed on the contact list. Here, the controller 110 merely controls display of the contact list and does not delete actual data.

When the integrated contact management function is performed, the controller 110 can control the display unit 130 to output the contact list editing screen for editing the contact list. The integrated contact management function (also called contact integration mode) can be initiated in a variety of ways, such as via a dedicated icon (not shown) that can be tapped, via a voice command, etc. The dedicated icon can be located, e.g., in a top or bottom position of a contact list viewing menu, in a settings menu, etc.

The contact list editing screen can include a first area that scrollably displays a list of all contacts that are obtained by synchronizing with the web server or the computer or user input and stored in the mobile terminal and a second area that displays selected contacts to be integrally managed. When a contact in the first area is selected by a touch or tapping, the controller 110 can register the selected contact in the second area. When two or more contacts are registered in the second area, the controller 110 removes a contact that is not the primary contact from the first area, i.e., the controller removes a secondary contact from the first area.

Advantageously, by removing the secondary contact from the contact list of the first area, the contact list is simplified, thereby facilitating the viewing and utilization of the contact list. Furthermore, when the contact integration mode is exited and the user enters a contact list viewing mode, primary contacts can be selected to obtain information not only for the primary contact but for the secondary contact(s) related to the primary contact. This is especially useful in cases where an original contact list is large, e.g., numbering in the hundreds or even over a thousand contacts. For instance, a primary contact can be selected as a head of a household while other members of the household can be designated as secondary contacts that are not displayed in the main contact list (of the first area). Thus, a user can easily recognize the head of the household, and simply tap on the name of the head of the household designated as a primary contact, to thereby view information on secondary members of the household in another field. Similarly, another primary contact can be designated for a business owner, with workers being designated as secondary (related) contacts to the business owner. Moreover, with a large number of contacts, it may be difficult to remember who each contact is. To this end, the designation of primary and secondary contacts can assist the user, as the user can associate the secondary contacts with the primary contacts by first selecting (tapping on the name of) a primary contact and then obtaining the related secondary contact information.

In the contact integration mode, when multiple contacts are selected, the controller 110 can set a contact that is firstly selected as the primary contact among the multiple selected contacts. Alternatively, the controller 110 can set a contact selected by the user from multiple contacts in the second area as the primary contact.

When a delete signal is inputted with respect to the second area via a touch operation or the like, the controller 110 can move the contact for which deletion is requested from the second area to the first area. In other words, the controller 110 can control an operation to delete the contact for which deletion is requested from the second area and display the deleted contact in the first area. In addition, when a primary contact change command is received, the controller 110 can change the primary to a requested contact. Here, the controller 110 can remove a previous primary contact from the first area and register a new primary contact in the first area. When a contact list editing complete command is received, the controller 110 can store the edited contact list in the storage unit 120 and terminate the contact integrating function.

Although not shown in FIG. 1, the mobile terminal 100 according to the present invention may optionally include other elements to achieve additional functions, for example, a camera module for capturing a still image or video, a short-range communication module for performing short-range communication, a broadcast reception module for receiving broadcast data, and a digital sound play module like a MP3 module. The elements of the mobile terminal 100 can vary according to the convergence trend of digital devices, and thus, not all elements are listed. However, the portable terminal 100 according to the present invention may further include elements equivalent to the level of foregoing structural elements.

Figure 2:
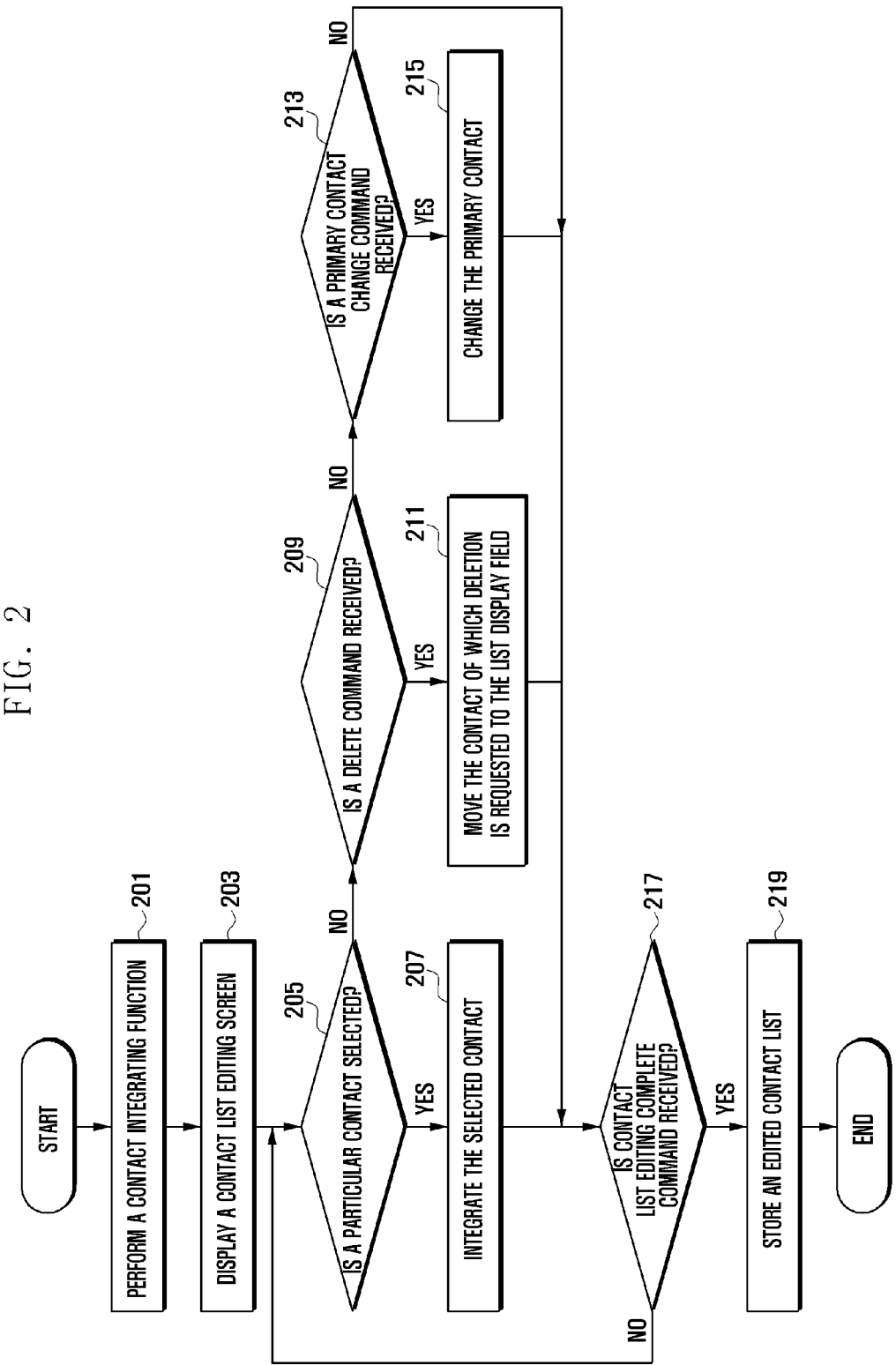
FIG. 2 is a flow chart illustrating a contact management method of a mobile terminal according to an exemplary embodiment of the present invention.
Figure 3:
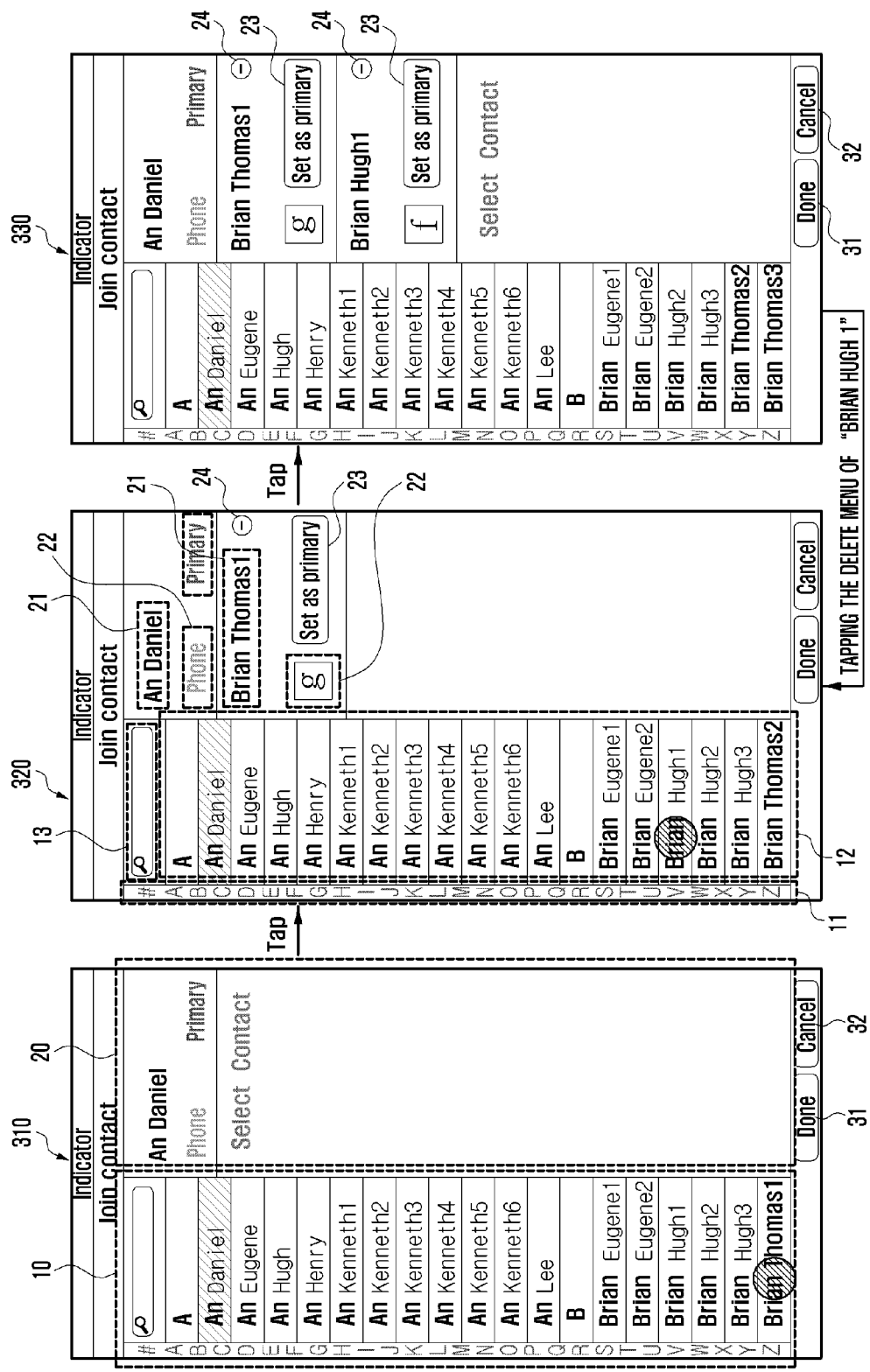
FIGS. 3 through 5 are example screens for explaining a contact management method of a mobile terminal according to an exemplary embodiment of the present invention.
Figure 4:
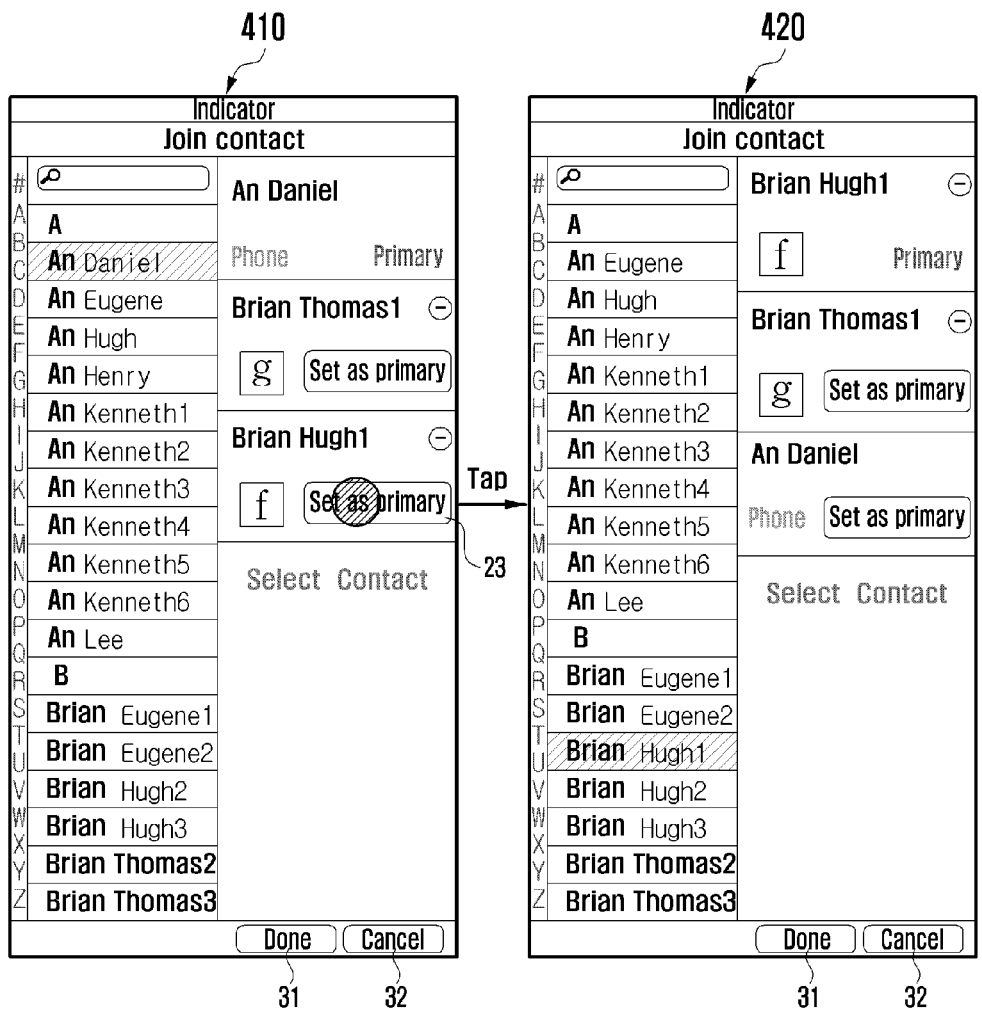
Figure 5:
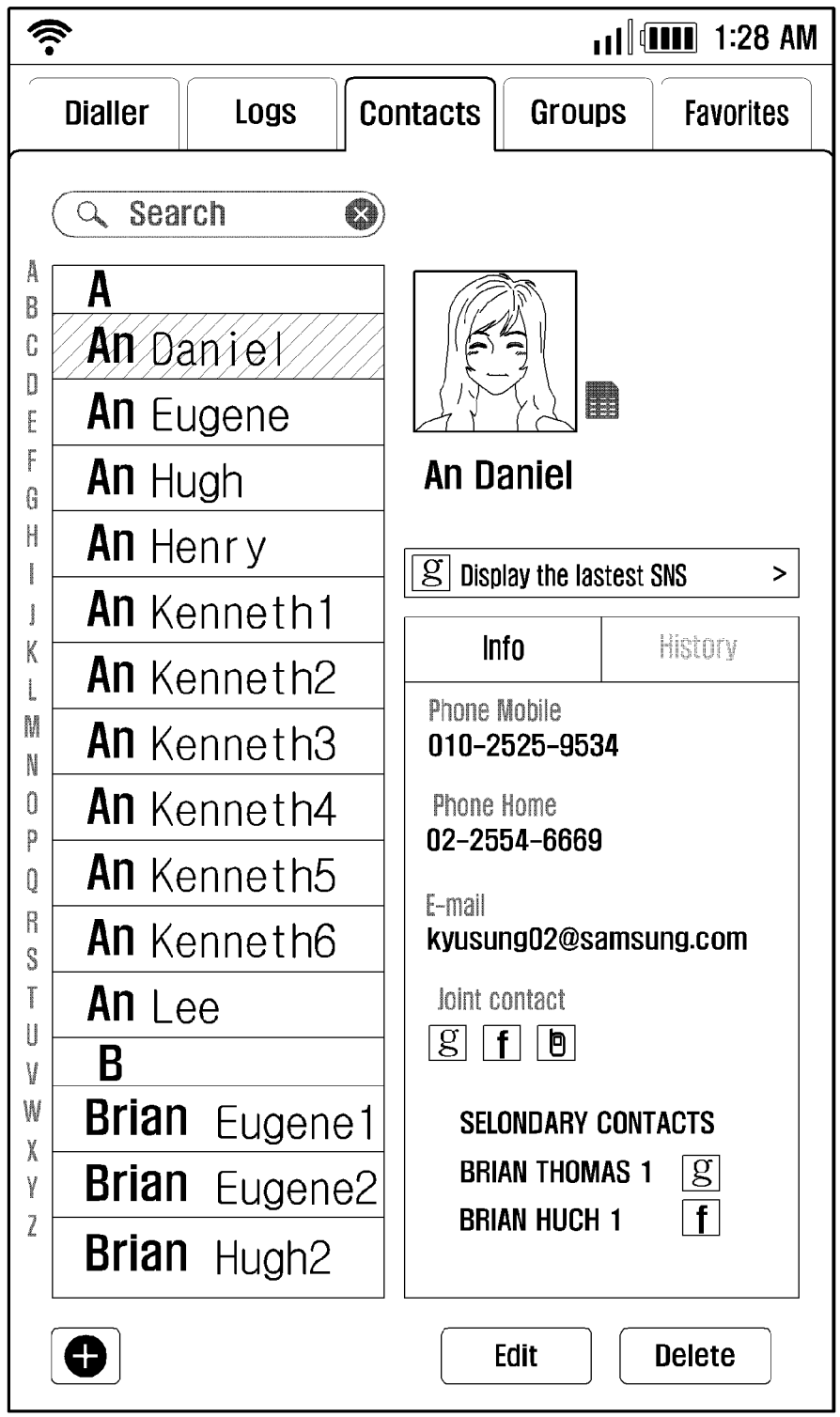

FIG. 2 is a flow chart illustrating a contact management method of a mobile terminal according to an exemplary embodiment of the present invention. FIGS. 3 through 5 are example screens for explaining a contact management method of a mobile terminal according to an exemplary embodiment of the present invention.

Referring collectively to FIGS. 1 through 5, the controller 110 according can detect whether the contact integrating function is performed (step 201). The contact integrating function can be performed by clicking a menu of the mobile terminal 100 or a sub menu that appears when a particular contact in the contact list is selected.

When the contact integrating function is performed, the controller 110 can control the display unit 130 to display a contact list editing screen (step 203). For example, the display unit 130 can output the contact list editing screen as shown in an example screen 310 of FIG. 3. The contact list editing screen can include a first area 10 in which a list of contacts stored in the storage unit 120 of the mobile terminal 100 is displayed and a second area 20 in which at least one primary contact for integrated contact management, i.e., at least one related contact is displayed, a complete ("Done") menu 31 for completing list editing, and a cancel menu 32 for returning to a previous step. With reference to an example screen 320, the first area 10 and the second area 20 are described. The first area 10 can include an index field 11, a list display field 12, and a search menu field 13 for searching contacts. The index field 11 is used to easily locate a desired contact. When a particular alphabet letter is selected by a touch or tapping, the controller 110 can output a list of contacts that start with the selected alphabet letter to the list display field 12. The list display field 12 is an area in which a list of all the contacts obtained by synchronizing with the web server and/or the computer and/or the user input and stored in the terminal is displayed. The search menu field 13 displays a search menu for searching all the contacts that have been entered, whether by the user, or downloaded from SNSs, etc. The index field 11 and the search menu field 13 can be set as a fixed image in which screen scrolling is not possible, whereas the list display field 12 can be set as an image that does permits screen scrolling, whereby the entire contact list is scrollably displayed.

The second area 20 can display the at least one related contact, for example, information of a contact selected from the list display field 12. The information displayed in the second area 20 can include a name 21 of a person corresponding to the selected contact, an image 22 that shows link information of the contact, a primary contact setting menu 23 for setting the primary contact, and a delete icon 24 for deleting the contact from the second area 20. Here, referring to an example screen 330, the second area 20 displays related contacts "An Daniel," "Brian Thomas 1," and "Brian Hugh 1" that are selected for integrated contact management. The first area 10 displays only "An Daniel" among the related contacts displayed in the second area 20 and the contacts "Brain Thomas 1" and "Brain Hugh 1" do not appear in the first area 10. In other words, the first one area 10 shows a contact list in which the contact "Brain Thomas 1" and the contact "Brain Hugh 1" are not included. Also, the user can notice that, among the contacts "An Daniel," "Brain Thomas 1" and "Brain Hugh" displayed in the second area 20, the contact "An Daniel" is set as the primary contact. Also, the user can notice that "An Daniel" is the contact manually entered by the user on the mobile terminal 100, "Brain Thomas 1" is the contact downloaded from the web server, i.e., Google®, (represented as a "g") and the contact "Brain Hugh 1" is the contact downloaded from another web server, i.e., Facebook®, represented as an "f".

The controller 110 can determine whether at least one particular contact is selected in the first area 10 (step 205). When the at least one particular contact is selected in the first area 10, the controller 110 can move the at least one selected particular contact to the second area 20 for the integrated contact management (step 207). Specifically, with reference to FIG. 3, as shown in the example screen 310, when the contact "An Daniel" is selected and the user selects another contact "Brian Thomas 1" by a touch or tapping, the controller 110 can move the selected contact "Brian Thomas 1" to the second area 20, as shown in the example screen 320. Here, the controller 110 can delete the contact "Brian Thomas 1" from the list display field 12. That is, with reference to the example screen 320, the contact "Brian Thomas 2" (not shown in the example screen 310), which is the next entry in the contact list, is now displayed at a previous position of the contact "Brian Thomas 1." Also, when the user further selects the contact "Brian Hugh 1" in the example screen 320, the controller 110 can move the selected contact "Brian Hugh 1" to the second area 20 as shown in the example screen 330. Here, as already described above, the controller 110 may delete the contact "Brian Hugh 1" from the list display field 12 after moving the contact to the second area 20.

As described above, according to the present invention, multiple related contacts can be selected from the contact list displayed in the first area 10, wherein the multiple contacts are managed by using the primary contact. For example, in the example screen 330, the user can manage the contacts "An Daniel", "Brian Thomas 1" and "Brian Hugh 1" by using the primary contact "An Daniel."

With continuing reference to FIG. 2, when the at least one particular contact is not selected at step 205, the controller 110 can determine whether a delete command for deleting the contact displayed in the second area 20 is received (step 209). The delete command is generated when the user touches or taps on the delete menu 24. When the delete command is received, the controller 110 can move the contact of which deletion is requested from the second area 20 to the list display field 12 of the first area 10 (step 211). For example, in the example screen 330, when the user touches the delete menu 24 of the contact "Brian Hugh 1" in the second area 20, the controller 110 can delete the contact "Brian Hugh 1" of which deletion is requested from the second area 20 and add the corresponding contact "Brian Hugh 1" in the list display field 12. In other words, the display unit 130 can output a screen as shown in the example screen 320.

In the method of FIG. 2, when the delete command is not received at step 209, the controller 110 can determine whether the primary contact change command for changing the primary contact is received (step 213). When the primary contact change command is not received at step 213, the controller 110 can proceed to step 217, which will be described below. When the primary contact change command is received at step 213, the controller 110 can change the primary contact to a contact selected by the user (step 215). Specifically, with reference to FIG. 4, it is shown in an example screen 410 that the contact "An Daniel" is set as the primary contact. When the user touches the primary contact setting menu 23 of the contact "Brian Hugh 1" to change the primary contact, the controller 110 can change the primary contact as the contact "Brian Hugh 1." With reference to an example screen 420, the contact "Brian Hugh 1" that is set as the primary contact is moved to a top position and the contact "An Daniel" that is a previous primary contact is moved to a bottom position. Also, in the list display field 12 of the first area 10, the previous primary contact "An Daniel" is deleted and the new primary contact "Brian Hugh 1" is added.

The controller 110 can determine whether the contact list editing complete command is received (step 217). This command can be received through the complete ("Done") icon 31 shown in FIGS. 3 and 4. When the command is not received, the controller 110 can return to step 205 to repeat the above described steps. When the contact list editing complete command is received, the controller 110 can store the edited contact list in the storage unit 120 and terminate the contact integrating function (step 219).

When a contact list view menu of a phone book menu is selected after the contact integrating function is terminated, the display unit 130 can display a contact list screen as shown in FIG. 5. The contact list screen can include a list display area for displaying the edited contact list and a detailed information display area for displaying detailed information of a contact selected from the contact list. In the edited contact list, the names of primary contacts such as An Daniel in the example, can be emphasized such as by highlighting, underlining, italicizing, etc., to enable the user to easily recognize which contacts have been designated as primary contacts.

In the detailed information display area, the detailed information can include, for example, an image, a name, a mobile phone number, a home phone, a work number, and an email address of a person corresponding to the selected contact. In particular, when the selected contact is the primary contact of a plurality of related contacts, the detailed information display area can display contact information of the related, secondary contacts associated with the primary contact in a "secondary contact" field. In the example, the names of Brian Thomas 1 and Brian Hugh 1 are listed in the secondary contact field, since these individuals were previously designated to be secondary contacts to An Daniels in the contact integration mode described above. Displayed next to Brian Thomas 1 is an icon "g" indicating that this person's contact information was obtained from the Google® SNS, and/or the person is still a member of the Google® SNS. Likewise, the icon "f" is displayed next to Brian Hugh 1 indicating his contact information was obtained from Facebook® and/or he is still a member of Facebook.

The detailed information display area can also display joint contact information, in a "Joint Contact" field of FIG. 5, indicating whether the primary contact is a member of multiple SNSs. Through the icons in the Joint Contact field, the user can recognize that the contact "An Daniel" is associated with contact information registered with Google®, contact information registered with Facebook®, and contact information registered with the phone book (symbol representing a mobile terminal). Here, the controller 110 can compare the contact information registered with Google, Facebook, and the phone book to one another and control the information displayed such that identical information appears only once in the detailed information display area. For example, when the contacts registered with Google and Facebook have the same email address, the controller 110 displays only one email address in an "E-mail" field.

In methods and apparatuses for contact information management of a mobile terminal according exemplary embodiments of the present invention, a plurality of related contacts can be managed by using one primary contact so that user convenience can be improved.

The above-described methods according to the present invention can be realized in the controller in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for contact management in a mobile terminal that provides a contact synchronization function, the method comprising:
    displaying, concurrently, a contact list editing screen having a first area in which an entire contact list is scrollably displayed and a second area in which a contact list for integrated management is displayed;
    registering at least first and second contacts representing different entities, which are selected from the first area, in the contact list of the second area, with the first contact being designating a primary contact and the second contact designated a secondary contact; and
    deleting the secondary contact from the contact list of the first area while maintaining the primary contact in the contact list of the first area.

2. The method according to claim 1, further comprising:
    changing the primary contact of the contacts displayed in the second area by designating the second contact as the new primary contact and relegating the former primary contact as a secondary contact;
    restoring the new primary contact to the contact list in the first area; and
    deleting the former primary contact from the contact list in the first area.

3. The method according to claim 1, wherein the contact synchronizing function synchronizes contact information for individual contacts received from multiple social network services (SNSs).

4. The method according to claim 1, further comprising: deleting at least one selected contact registered in the second area.

5. The method according to claim 4, wherein the deleting the at least one selected contact comprises:
    deleting a contact for which deletion is requested from the second area and restoring the contact thereby deleted to the contact list of the first area.

6. The method according to claim 1, further comprising: storing an edited contact list.

7. The method according to claim 6, further comprising emphasizing primary contacts in the edited contact list in a contact list display mode.

8. The method according to claim 7, further comprising displaying, in a contact list display mode, contact information of a primary contact when the primary contact is selected, the contact information including at least one secondary contact previously registered.

9. The method according to claim 8, wherein the contact information displayed further includes information representing one or more social network services to which the primary contact belongs.

10. An apparatus for contact management of a mobile terminal that provides a contact synchronization function, the apparatus comprising:
    a display unit configured to display, concurrently, a contact list editing screen having a first area in which an entire contact list is scrollably displayed and a second area in which a contact list for integrated management is displayed; and
    a controller configured to register at least first and second contacts representing different entities, which are selected from the first area, in the contact list of the second area, with the first contact designated a primary contact and the second contact a secondary contact, and the controller configured to delete the secondary contact from the contact list of the first area while maintain the display of the primary contact in the contact list of the first area.

11. The apparatus according to claim 10, wherein, when a command is received for requesting a change of the primary contact in the contact list registered in the second area to designate the second contact as the new primary contact and relegate the former primary contact as a secondary contact, the controller is configured to restore the new primary contact to the contact list displayed in the first area and delete the former primary contact from the contact list in the first area.

12. The apparatus according to claim 10, wherein, when a command for deleting a contact in the contact list registered in the second area is received, the controller is configured to restore the contact thereby deleted to the contact list of the first area.

13. The apparatus according to claim 10, wherein the controller is configured to store an edited contact list.

14. The apparatus according to claim 13, further comprising means for emphasizing primary contacts in the edited contact list in a contact list display mode.

15. The apparatus according to claim 13, wherein the display unit is further configured to display, in a contact list display mode, contact information of a primary contact when the primary contact is selected, the contact information including at least one secondary contact previously registered.

16. An apparatus for displaying information on a mobile terminal display the apparatus comprising:
    a display unit configured to display a plurality of items in a list within a first area;
    the display unit displaying, concurrently with the plurality of items in a list within the first area, at least first and second selected and related items, representing different entities, of the plurality of items in a second area; and
    a controller configured to selectively designate one of the first and second items as a primary item and the other of the first and second items as a secondary item, and cause automatic removal of the secondary from the first area while maintaining the primary item in the first area.

17. The apparatus according to claim 16, wherein the first item displayed in the first area is a representative item of the items displayed in the second area.

18. The apparatus according to claim 17, wherein the representative item is automatically set as an item placed at a top position in the second area.

19. The apparatus according to claim 17, wherein the representative item is changed as an item selected by a user from the items displayed in the second area.

* * * * *

UNITED STATES PATENT AND TRADEMARK OFFICE
CERTIFICATE OF CORRECTION

| | | |
|---|---|---|
| PATENT NO. | : 8,489,076 B2 | Page 1 of 1 |
| APPLICATION NO. | : 13/208397 | |
| DATED | : July 16, 2013 | |
| INVENTOR(S) | : Tae Yeon Kim | |

It is certified that error appears in the above-identified patent and that said Letters Patent is hereby corrected as shown below:

In the Claims:

Column 10, Claim 16, Line 60 should read as follows:
--...the secondary item from the first area...--

Signed and Sealed this
Seventeenth Day of September, 2013

Teresa Stanek Rea
*Deputy Director of the United States Patent and Trademark Office*